Nov. 20, 1962   L. G. SIMJIAN   3,064,553
BEVERAGE BREWING APPARATUS
Filed Jan. 9, 1962   4 Sheets-Sheet 1
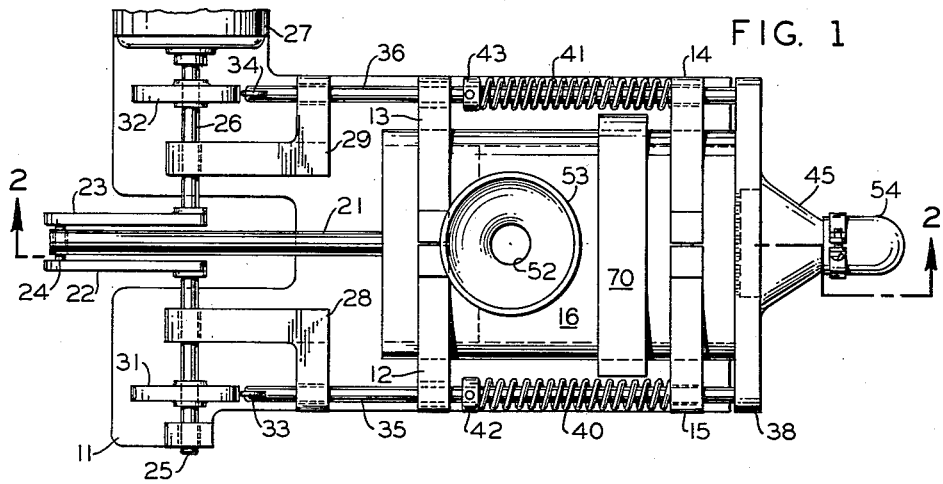
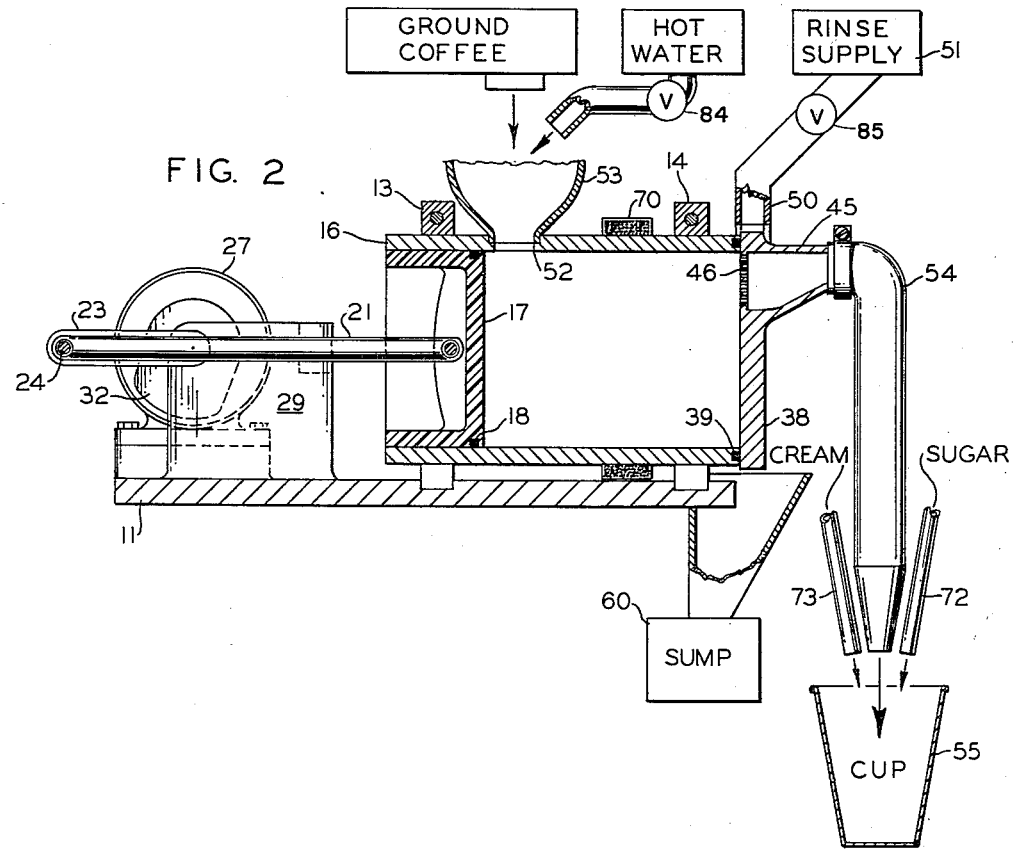
INVENTOR.
LUTHER G. SIMJIAN
BY
Ervin B. Steinberg
AGENT Nov. 20, 1962  L. G. SIMJIAN  3,064,553
BEVERAGE BREWING APPARATUS
Filed Jan. 9, 1962  4 Sheets-Sheet 2
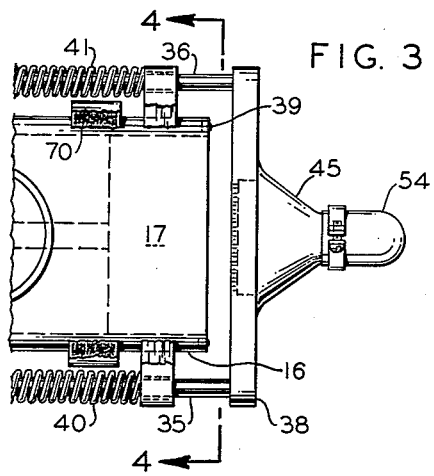
FIG. 3
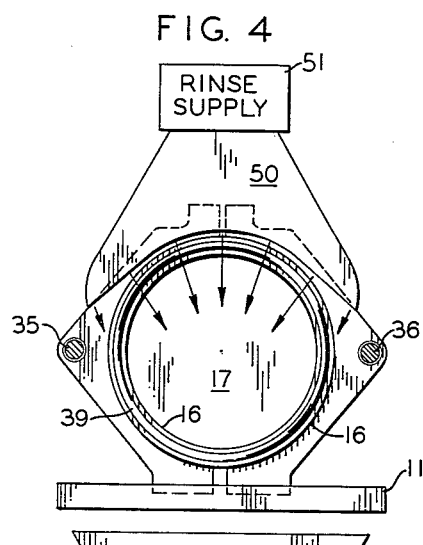
FIG. 4
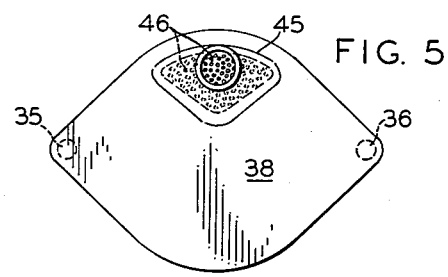
FIG. 5
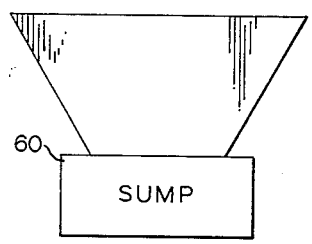
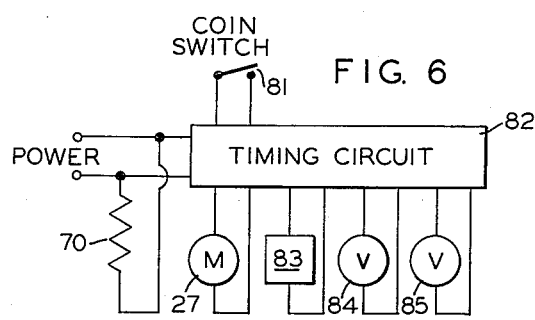
FIG. 6
INVENTOR.
LUTHER G. SIMJIAN
BY
Erwin B. Steinberg
AGENT

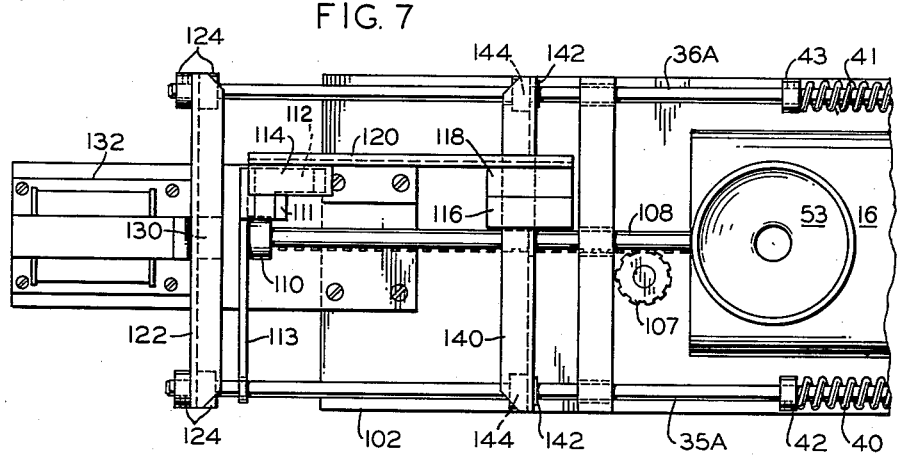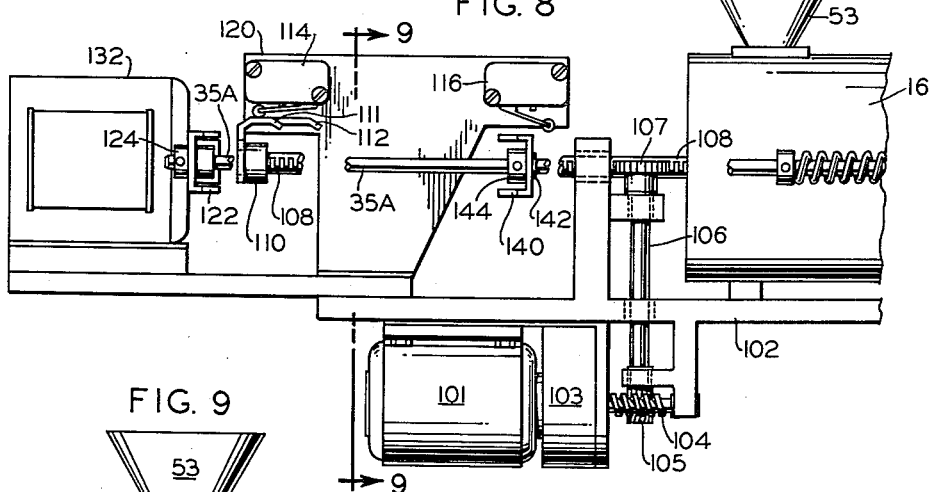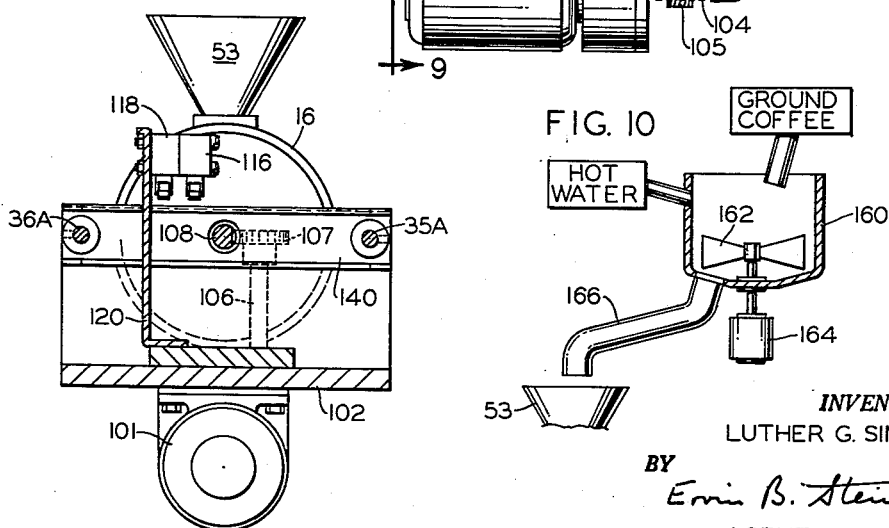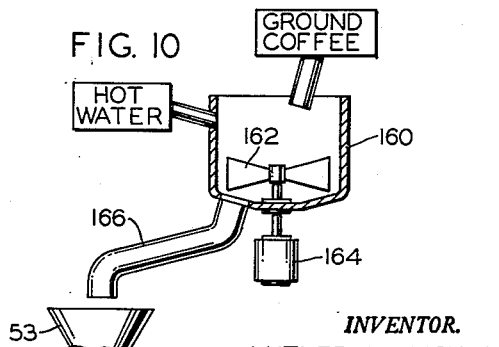

Nov. 20, 1962 L. G. SIMJIAN 3,064,553
BEVERAGE BREWING APPARATUS
Filed Jan. 9, 1962 4 Sheets-Sheet 4

INVENTOR.
LUTHER G. SIMJIAN
BY
Ervin B. Steinberg
AGENT

United States Patent Office 3,064,553
Patented Nov. 20, 1962

1

3,064,553
BEVERAGE BREWING APPARATUS
Luther G. Simjian, Greenwich, Conn., assignor to Universal Match Corporation, Ferguson, Mo., a corporation of Delaware
Filed Jan. 9, 1962, Ser. No. 166,982
12 Claims. (Cl. 99—289)

This application is a continuation-in-part of my application for Letters Patent, Serial No. 138,183 filed September 14, 1961, and now abandoned.

The present invention relates to a machine for preparing a hot beverage, such as coffee, and particularly refers to a machine which in each cycle, as initiated for example at random intervals in a vending machine, brews and dispenses a predetermined amount of the beverage.

More particularly the invention concerns a machine which provides a brewed beverage, such as coffee or tea, by mixing in an infusion chamber, or cavity, hot liquid with a beverage substance and subsequently dispenses the brewed beverage through one opening while discharging remaining solid beverage substance through another opening.

In accordance with the present invention, for each cycle of the machine, which may be as short as five or six seconds, a measured charge of ground coffee or the like is transferred to a cavity. Concurrently therewith or in timed relation, a measured amount of hot water is transferred into the cavity and by means of a piston, force is exerted upon the mixture of ground coffee and hot water. By virtue of the force, brewed coffee is discharged from the cavity and dispensed to a drinking cup or other receptacle. The remaining solid ground coffee, in slightly moist condition, is expelled from the cavity before the next fresh charge is delivered thereto.

In accordance with one feature of the invention, the cavity is provided at one end with a cover which is removed from the cavity for enabling piston means disposed in the cavity to discharge the remaining beverage substance.

In accordance with another feature of the invention, fluid spray means are activated for aiding in the removal of the spent charge which is pushed by the motion of the piston into an opening between the cavity and the removed cover.

In accordance with still another feature of the invention, a coffee brewing apparatus is provided which is characterized by extreme simplicity, and relatively few moving parts, thus providing utmost reliability for automatic vending machines.

Further and still other features of the invention will be apparent from the following description when taken in conjunction with the accompanying drawings in which:

FIGURE 1 is a top plan view of the beverage brewing apparatus according to one embodiment of the instant invention;

FIGURE 2 is an elevational view, partly in section, along lines 2—2 in FIGURE 1;

FIGURE 3 is a plan view, partly in section, of the end portion of the cavity when the piston has reached its maximum travel toward the removable cover;

FIGURE 4 is an end view along lines 4—4 in FIGURE 3;

FIGURE 5 is a plan view of the cover which normally seals one end of the cavity;

FIGURE 6 is a schematic electrical circuit diagram;

FIGURE 7 is a top plan view of a modification of the beverage brewing apparatus;

FIGURE 8 is a side elevational view of the design per FIGURE 7;

FIGURE 9 is a view along section lines 9—9 in FIGURE 8;

2

Figure 11:
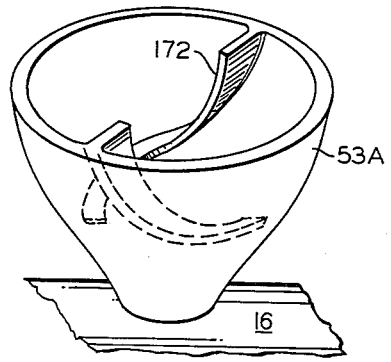
Figure 12:
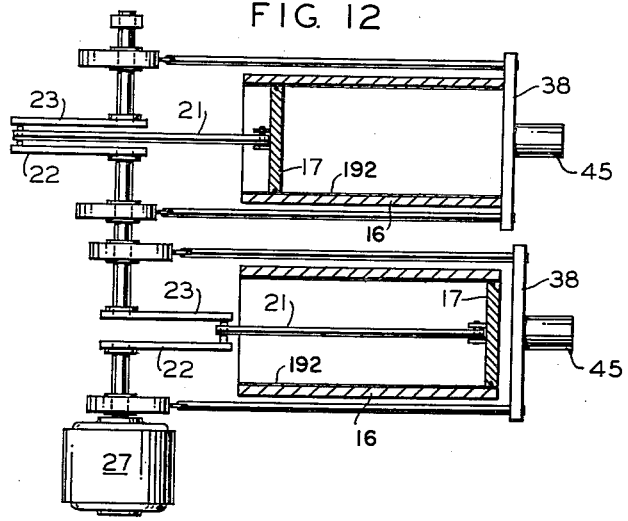

FIGURE 10 is a sectional view of an attachment to the brewing apparatus;

FIGURE 11 is a view of a modification of the funnel which forms a part of the beverage brewing apparatus, and FIGURE 12 is a schematic, sectional plan view of an arrangement of two brewing chambers with pistons shifted relative to one another.

Referring now to the figures and FIGURES 1 through 5 in particular, numeral 11 identifies a base plate which supports the entire apparatus. Upstanding from the base plate 11 there is provided a pair of split flanges 12, 13, 14, and 15 for holding therebetween a cylindrical enclosure or cavity 16. The cavity, made from tubular aluminum, is supported by the flanges in a substantially horizontal position as shown in FIGURE 2. Each set of flanges is bolted together by conventional screw means. One end of the cavity is sealed off by a piston 17 which is equipped with an O-ring gasket 18. The piston is mounted for reciprocatory motion in the cavity, being driven by crankshaft drive means which comprise pitman 21 and a set of levers 22 and 23 which are attached to pitman 21 by means of a cross pin 24. Each lever in turn is supported by a respective cross shaft 25 and 26, the latter receiving rotation from an electric motor 27. Cross shaft 25 is supported in an upstanding bracket 28 and cross shaft 26 in bracket 29, both brackets extending from base plate 11. Each of the cross shafts 25 and 26 has fastened thereupon a respective cam 31 and 32, and the cams therefore rotate in synchronism with pitman 21. A set of cam followers 33 and 34 is attached to respective rods 35 and 36 which span the length of the cavity and which are mounted in respective supports 28, 15, and 29 and 14 for sliding longitudinal motion in response to the rotation of cams 31 and 32.

Rods 35 and 36 terminate at their other end in cover 38 which seals the opposite end of the cavity. Effective sealing is provided by means of gasket 39 which preferably is recessed in the end surface of the cylindrical portion of the cavity. Helical compression springs 40 and 41 which surround respective rods 35 and 36 are confined between brackets 14 and 15 and collars 42 and 43, the latter by means of set screws being held to rods 35 and 36. These spring means exert a bias on the cover 38, urging the cover toward the cavity, hence attempting to maintain the cavity sealed.

When the piston has been moved to the opposite end, as shown in FIGURE 3, the radial front surface of the piston 17 is substantially flush with the end of the cavity. Also, cover 38 has been moved away from the cavity to provide a predetermined separation between the cavity and the cover, the width and duration of this separation being determined by the shape of cam surfaces 31 and 32 which via rods 35 and 36 move the cover 38 against the force of the spring means, i.e. away from the cavity.

The cover is provided with an aperture and a hose connection 45, and the side of the cover which faces the piston is provided with a metal strainer 46 as best seen in FIGURE 5. The strainer and aperture serve as an exhaust port for the brewed liquid and it will be apparent that the exhaust port may be disposed either at top or at the bottom of the cover, or that the exhaust port or strainer may comprise a substantial part of the cover itself.

Directly above the separation between the cavity and the cover, FIGURE 4, there is provided a head 50 which is connected to a rinse supply 51. The rinse supply contains a suitable fluid such as water, compressed air, or a mixture thereof, for directing by suitable nozzle means a forceful spray of fluid into the separation between the cavity and the cover for washing and rinsing both parts as well as for aiding in the removal of solid beverage substance as will be described in greater detail hereafter.

Operation of the instant apparatus may be visualized as follows: At the beginning of the cycle, the piston is withdrawn to one end of the cavity as shown in FIGURES 1 and 2. Upon the apparatus being actuated in response to the deposit of money or some other control, a measured amount of ground coffee and hot water is inserted into the cavity 16 via inlet port 52 which is provided with a funnel 53. By properly timing the hot water dispensing cycle, the hot water can be used for rinsing ground coffee or any other suitable beverage substance remaining in the funnel 53 into the cavity. In the starting condition depicted, the inlet port is disposed between the cover 38 and piston 17, the cavity being closed. When motor 27 is started in response to control means, such as timing means, piston 17 advances toward the cover 38. The advance of the piston closes off the inlet port means and simultaneously exerts pressure on the brew confined in the cavity. Increasing pressure, as the piston advances, extracts the liquid from the cavity via strainer 46, exhaust port 45, and tubing 54 toward drinking cup 55. As the piston nearly reaches its extreme right position as shown in FIGURE 3, cams 31 and 32 rather rapidly move cover 38 away from the cavity for providing the predetermined amount of separation. The front surface of piston 17 pushes ahead the remaining solid beverage substance, ground coffee, which as the front surface of the piston advances toward the separation, is caused to drop by gravity into sump 60. Gasket 18 housed in the piston aids to clean the inside of the cavity, causing all of the brewed beverage and solid beverage substance to be confined in the space between the front of the piston and the cover. Subsequently, rinse supply 51 is activated to inject a fluid spray into the separation between the cover and the cavity, thereby forcing any remaining beverage substance into the sump and simultaneously rinsing the cover, piston surface, and O-ring gasket 39. By slightly extending the travel of the piston beyond the cavity opening, gasket 18 can be exposed to the rinse fluid for cleaning the gasket during each brewing cycle. Briefly thereafter, the piston is withdrawn toward the starting position and concomitant rotation of cams 31 and 32 enables the spring means to restore the cover to the cavity. When piston 17 returns to the position shown in FIGURES 1 and 2, cycling means interrupt the circuit to motor 27, causing the instant apparatus to be reset for a new cycle of operation.

Heating means, such as an electric heater 70, surround the cavity to continuously maintain the cavity at an elevated temperature. Adjacent to tubing 54 which fills cup 55 with brewed liquid, there are provided sugar and cream dispensing tubes 72 and 73 which are operated in the conventional manner.

It will be apparent that depending upon the shape of the cams, the separation between the cavity and the cover can be selected for proper removal of the spent charge. Also, the timing of the opening of the cavity can be adjusted to such an extent that suitable pressure is exerted upon the beverage substance to obtain optimum utilization of the solid beverage substance which subsequently is expelled from the cavity by the motion of the piston. For providing a satisfactory rinsing effect, the nozzles directing the fluid spray into the separation preferably are arranged to provide a semi-circular spray across the upper half of the separation, thereby forcing remaining beverage substance toward the sump 60 and rinsing the piston and cover surfaces as well as gasket 39 free from any remaining beverage substance or brewed beverage. If desired, the rinse supply may be mixed with steam which, as is well known, forms an extremely active cleaning medium.

Typical control means are indicated in FIGURE 6. Heater 70 is connected to the power line for maintaining the cavity at the proper operating temperature. When for instance a coin trips switch 81, timing means 82 are energized which first operate the ground coffee metering device 83 and valve 84 to inject predetermined amounts of beverage substance and hot water into the cavity. Next, motor 27 is started for driving the piston. When the cover is momentarily lifted off the cavity, the piston having reached its extreme position, valve 85 connected to the rinse supply 51 opens to provide the rinse spray via head 50. Briefly thereafter, the rinsing stops and when piston 17 has returned to its starting postion, motor 27 is shut down.

FIGURES 7 through 9 depict a modification of the brewing apparatus employing in part the force produced by electromagnetic means for biasing cover 38 toward the cylindrical cavity. As the initiation and release of this force is readily controllable, several constructional advantages become apparent, particularly, springs 40 and 41 can be made to exert a lower force than the comparable springs in FIGURES 1 and 2 and hence, the drive motor can be of a smaller size since this motor during its final stroke portion when the cover is pushed back is required merely to overcome the force exerted by relatively soft springs.

A bidirectional motor 101 mounted underneath frame 102 drives via a gear reduction unit 103 a worm 104. Worm gear 105 meshing with the worm is attached to a vertical shaft 106 to rotate a pinion 107 which meshes with a rack 108, the latter taking the place of pitman 21 in FIGURES 1 and 2. As the motor rotates, rack 108 is moved in longitudinal direction thereby either advancing or retracting the piston inside the cylinder relative to cover 38.

Rack 108 terminates in a bushing 110 to which is fastened a bracket 113 having two switch actuating fingers numbered respectively 111 and 112. As rack 108 moves, fingers 111 and 112 respectively actuate stationary electrical circuit switches 114, 116 and 118 which are mounted to a sheet metal bracket 120. Rods 35A and 36A replace previously numbered rods 35 and 36, and these rods terminate in a transverse U-shaped in cross-section bracket 122 which is fastened to rods 35A and 36A by means of threaded nuts 124. This transverse bracket moves therefore in unison with cover 38. Bracket 122 is coupled to the armature 130 of a stationary solenoid 132. A further transverse bracket 140 is fastened to rods 35A and 36A by means of respective rings 142 and collars 144.

Operation of this modified apparatus may be visualized as follows: When cover 38 closes the cylindrical cavity, rack 108 and transverse brackets 122 and 140 are in the position shown in FIGURE 7. Upon energizing motor 101, causing rotation of pinion 107, rack 108 is moved longitudinally to advance the piston 17 in the direction toward cover 38. As the rack and piston move, bushing 110 attached to the rack end moves toward the right as viewed in FIGURES 7 and 8, carrying along fingers 111 and 112 which form a part of bracket 113 and which is supported for sliding motion along rod 35A. As finger 112 leaves switch 114, the switch is operated and applies electrical energy to solenoid 132 in order to apply a retaining force to bracket 122, thus maintaining the bracket stationary and hence cover 38 sealed against the cylindrical cavity. The force now exerted by the solenoid is used therefore to overcome the hydrostatic pressure created by the piston advancing toward the cover. As bushing 110, traveling with the rack, approaches the position of transverse bracket 140, bracket 140 being provided with an aperture for clearing the diameter of the rack, bushing 110 engages bracket 140 and advances this bracket which is fastened to rods 35A and 36A toward the right thereby removing the cover from the cavity. Concurrently therewith, finger 112 engages switch 118 for causing electrical energy cut-off to solenoid 132, thus instantly releasing the retaining force provided by the solenoid. Rods 35A and 36A as well as brackets 122 and 140 advance a little further toward the right by virtue of bushing 110 bearing against bracket 140, and shortly thereafter when the desired separation has been reached, finger 111 actuates switch 116 to stop forward motion of drive motor 101. At this point the cover is fully removed from the cavity as shown in FIGURE 3. Actuation of switch 116 causes operation also of suitable relays for activating the rinse supply 51 and for subsequently reversing the rotation of motor 101 to return the piston toward its starting position, the condition shown in FIGURE 7. Springs 40 and 41 are dimensioned such as to cause closing of the cover when bushing 110 reverses its travel.

It will be apparent that in the modified construction, the springs are used primarily for restoring the cover to its position on the cylindrical cavity while the holding force for maintaining the cover closed against the force produced by the hydrostatic pressure is generated by electromagnetic means, that is, solenoid 132. In this way the softer springs permit the motor to be of reduced size.

FIGURE 10 shows a pre-mixing device which serves to premix the beverage substance, particularly ground coffee with water, in order to obtain a full strength brew. In the arrangement shown, a pre-mixing container 160 is provided with a rotating blade 162 which is driven from a motor 164 disposed underneath container 160. Coffee powder and hot water are released into container 160 while blade 162 is rotating, the thoroughly mixed mixture being then discharged via pipe 166 into funnel 53.

A similar pre-mixing effect can be achieved by arranging a set of vanes 172 within funnel 53A as shown in FIGURE 11 thereby causing a whirling motion of the hot water to effect a thorough wetting of the coffee powder.

For high-speed operation, it may be desirable to eliminate the lost time occurring when the piston is reset. To this end, an arrangement as shown in FIGURE 12 can be used in which two brewing chambers are provided with the pistons driven from a common motor 27. The pistons are 180 degrees out of phase with respect to one another so that one piston is delivering the brewed beverage while the other piston is being reset during the very same time interval. As shown, one piston is disposed at its retracted position while the other piston is at its maximum extended position. Thus, a substantially continuous flow of brewed liquid is attained, particularly when both exhaust ports 45 are joined in a common delivery outlet. In every other respect, the construction of the brewing chambers is substantially identical with that shown in FIGURES 1 through 5, but as shall be clearly understood, the chambers may be modified in accordance with the teachings of FIGURES 7 through 9.

In order to reduce friction of the piston sliding in the cylinder and to aid in maintaining cleanliness of the brewing chamber, it will be advantageous to coat the inside of the cylinder, or the outside surfaces of the piston, or both, with a thin coating 192 of tetrafluoroethylene of the type commercially known as Teflon or Kel-F. These coatings not only reduce frictional contact but also prevent adhesion of food particles and staining of the brewing chamber.

It will be apparent that the cavity described heretofore may be dimensioned to brew one cup at a time or to brew coffee on a batch basis. Several cavities may be provided in a single machine and in one typical embodiment, a small cavity for cup size drinks is supplemented by a larger cavity for brewing a quantity of cups at one time, for instance 15 to 20 cups. The larger cavity is controlled by timing means to operate during peak demand hours when a quantity of drinks is to be dispensed in a comparatively short period of time.

While there have been described and illustrated certain specific embodiments of the present invention, it will be apparent to those skilled in the art that various further changes and modifications may be made therein without deviating from the intent and principle of the instant invention, which shall be limited only by the scope of the appended claims.

What is claimed is:

1. In a cyclically actuated beverage brewing apparatus the combination: an elongated brewing cavity; a piston adapted for reciprocating motion disposed in said cavity and closing one end of said cavity; a movable cover normally closing the other end of the cavity; resilient means for engaging said cover and urging it in contact with said cavity to maintain said cavity closed; inlet port means disposed at one end of the cavity; screened withdrawal port means disposed on said cover at the opposite end of said cavity; drive means for moving said piston initially in a first direction to one extreme end of the cavity whereby to cause said inlet port means to become disposed between said piston and cover; means for injecting a liquid and beverage substance into the cavity at said inlet port means whereby to fill said cavity; said drive means subsequently adapted to cause said piston to advance in a second direction toward said cover whereby to exert a force on said liquid and cause extraction of said liquid from said cavity through said screened withdrawal port means with solid beverage substance remaining in the cavity, confined in the space between said piston and cover; cam means for moving said cover rapidly in the second direction against the force of said resilient means for opening said cavity; said drive means subsequently adapted to advance said piston in the second direction and said cam means adapted to move said cover whereby to leave a predetermined amount of separation between said cavity and cover; said piston in response to its motion toward said separation adapted to expel said solid substance from the cavity through said separation; fluid spray means disposed external of said cavity for directing a spray toward said separation to aid in the removal of solid substances from contact with said cover and piston; said drive means subsequently adapted to move said piston in said first direction, and said cam means adapted to release said cover for causing said resilient means to restore said cover to said cavity.

2. In a cyclically actuated beverage brewing apparatus the combination of: a support, an elongated tubular brewing cavity retained in said support; a piston adapted for reciprocating motion disposed in said cavity and adapted to close one end theerof; a movable cover closing the other end of the cavity; a set of rods disposed outside said cavity and fastened at one end to said cover; spring means for engaging said rods and support for maintaining said cover normally in engagement with said cavity; inlet port means disposed at one end of the cavity; screened withdrawal port means disposed on said cover at the opposite end of said cavity; crankshaft drive means connected to said piston for moving said piston initially in a first direction to one extreme end of the cavity whereby to cause said inlet port means to become disposed between said piston and said cover; means for injecting a predetermined amount of liquid and beverage substance into the cavity at said inlet port means whereby to partially fill said cavity; said drive means subsequently adapted to cause said piston to advance in a second direction toward said cover whereby to exert a force on said liquid and cause extraction of said liquid from said cavity through said screened withdrawal port means with solid beverage substance remaining in the cavity confined in the space between said piston and cover; cam means coupled to said drive means and adapted to engage the other end of said rods for moving said cover rapidly in the second direction against the force of said spring means whereby to remove said cover from said cavity; said drive means subsequently adapted to advance said piston in the second direction and said cam means simultaneously moving said cover whereby to leave a predetermined amount of separation between said cavity and cover; said piston in response to its motion toward said separation adapted to expel said solid substance from the cavity through said separation; fluid spray means disposed external of said cavity for directing a spray toward said separation to aid in the removal of solid substances from said separation and contact with said cover and piston; said drive means subsequently adapted to move the piston in said first direction and said cam means simultaneously adapted to release said cover whereby to restore said cover to said cavity, and heating means surrounding the cavity for maintaining the cavity at an elevated temperature commensurate with the brewing temperature of the beverage.

3. In a beverage brewing apparatus as set forth in claim 2 wherein the motion of said cover and of said piston occurs along the same axis.

4. In a beverage brewing apparatus as set forth in claim 2 wherein said fluid spray means directs a plurality of radial sprays toward said separation.

5. In cyclically actuated beverage brewing apparatus the combination of: a support; an elongated horizontally disposed tubular brewing cavity retained in said support; a piston adapted for reciprocating motion disposed in said cavity and adapted to close one end thereof; an annular gasket disposed on said piston for providing a seal between said cavity and piston; a movable cover; gasket sealing means disposed between said cavity and cover; a set of rods disposed outside said cavity and fastened at one end to said cover; spring means for engaging said rods and support for maintaining said cover normally in engagement with the other end of said cavity; inlet port means disposed at one end of the cavity; screened withdrawal port means disposed on said cover at the opposite end of said cavity; crankshaft drive means connected to said piston for moving said piston initially in a first direction to one extreme end of the cavity whereby to cause said inlet port means to become disposed between said piston and said cover; means for injecting a predetermined amount of liquid and beverage substance into the cavity at said inlet port means whereby to partially fill said cavity; said drive means subsequently adapted to cause said piston to advance in a second direction toward said cover whereby to exert a force on said liquid and cause extraction of said liquid from said cavity through said screened withdrawal port means with solid beverage substance remaining in the cavity confined in the space between said piston and cover; cam means coupled to said drive means for engaging the other end of said rods for moving said cover rapidly in the second direction against the force of said spring means whereby to remove said cover from said cavity; said drive means subsequently adapted to advance said piston in the second direction and said cam means simultaneously moving said cover whereby to leave a predetermined amount of separation between said cavity and cover; said piston and gasket thereon in rseponse to motion thereof toward said separation adapted to expel said solid substance from the cavity through said separation whereby the gasket is adapted to clean the inner surface of said cavity; fluid spray means disposed external of said cavity for directing a spray toward said separation to aid in the removal of solid substances from said separation and contact with said cover and piston and adapted to direct a spray also toward the gasket on said piston for cleaning said gasket; said drive means subsequently adapted to move the piston in said first direction and said cam means simultaneously releasing said cover whereby to restore said cover to said cavity; and heating means for surrounding the cavity for maintaining the cavity at an elevated temperature commensurate with the brewing temperature of the beverage.

6. In a beverage brewing apparatus the combination: a brewing cavity; a piston movably mounted in said cavity and closing one end of said cavity; a movable cover closing the other end of the cavity; resilient bias means and selectively operable means engaging said cover for urging the cover in contact with said cavity; inlet port means disposed at one end of the cavity; screened withdrawal port means disposed on said cover at the opposite end of said cavity; means for moving said piston initially to one extreme end of the cavity in the direction of said inlet port means whereby to cause said inlet port means to become disposed between said piston and cover and its withdrawal port means; means for injecting a liquid and beverage substance into the cavity at said inlet port means whereby to partially fill said cavity; drive means for subsequently causing said piston to advance toward said cover whereby to exert a force on said liquid to cause extraction of said liquid from said cavity through said withdrawal port means with solid beverage substance remaining in the cavity confined in the space between said piston and cover; said drive means subsequently adapted to advance said piston in the same direction to cause removal of said cover from said cavity, to leave a predetermined amount of separation between said cavity and cover; said piston in response to its motion toward said separation adapted to expel said solid substance from the cavity through said separation; fluid means disposed for removing said solid substance from contact with said cover and piston, and said drive means subsequently adapted to reverse the motion of said piston for causing said resilient means to restore said cover to said cavity.

7. In a beverage brewing apparatus as set forth in claim 6 wherein said selectively operable means comprises electromagnetic means.

8. In a beverage brewing apparatus the combination: a brewing cavity; a piston adapted for deciprocatory motion disposed in said cavity and closing one end of said cavity; a movable cover; resilient means disposed for urging the cover into contact with the other end of the cavity for maintaining said other end closed; inlet port means disposed in proximity to said one end of the cavity; screened withdrawal port means disposed on said cover; drive means coupled to said piston for moving the piston initially to one extreme end of the cavity in the direction of said inlet port means whereby to cause said inlet port means to become disposed between said piston and cover; means for injecting a liquid and beverage substance into the cavity at said inlet port means whereby to fill said cavity; a solenoid actuated means coupled to said cover for producing, when the solenoid is energized, a force which urges said cover into contact with the cavity to maintain the respective cavity end closed; control means for energizing said solenoid when said piston, in response to the operation of the drive means, is advanced from its initial position toward said cover whereby to maintain said cover in contact with the other end of the cavity while the piston exerts a force on said liquid and cover and causes extraction of said liquid from said cavity through said withdrawal port means; further control means subsequently operable for de-energizing said solenoid as the piston advances toward the cover whereby to cut-off the force produced by said solenoid and enabling the cover to be removed from the cavity; means for removing said cover from the cavity as the piston approaches its extreme position in the direction toward the cover and said piston in reponse to its motion adapted to expel remaining beverage substance from the cavity into the space between said opened cavity and cover, and said drive means subsequently adapted to reverse the motion of said piston whereby said resilient means restore said cover to said cavity to close the respective end.

9. A beverage brewing apparatus as set forth in claim 8 wherein said inlet port means is provided with means for pre-mixing the liquid and beverage substance.

10. A beverage brewing apparatus as set forth in claim 8 wherein said inlet port means is provided with a funnel and vanes for obtaining pre-mixing of said liquid and beverage substance prior to entry thereof into the brewing cavity.

11. In a beverage brewing apparatus the combination of: a pair of brewing cavities; each cavity being provided with an inlet port means and a withdrawal port means, the inlet and withdrawal port means being spaced from one another in a respective cavity; a piston adapted for reciprocatory motion disposed in each of said cavities and each piston closing one end of a respective cavity; a movable cover associated with an opposite end of each cavity and adapted when in contact therewith to close the same; motive means for moving each piston to one extreme end of the respective cavity in the direction of the inlet port means whereby to cause the respective inlet port means to become disposed between the piston and cover; means associated with each cavity for injecting a liquid and a solid beverage substance into the cavity; said motive means subsequently adapted to cause each piston in the respective cavity to advance toward the respective cover whereby to cause extraction of liquid from the respective cavity through said withdrawal port means with solid beverage substance remaining in the cavity and confined in the space between the respective piston and cover; means for subsequently removing the respective cover from the associated cavity whereby to open the respective end of the cavity while said motive means advances the associated piston toward the opening for causing said solid beverage substance to be expelled from the cavity; said motive means subsequently adapted to withdraw the respective piston to the opposite end of the associated cavity whereby to restore the removed cover to its position on the cavity, and coupling means between the motive means and both pistons for causing the pistons to be phase-shifted by substantially 180 degrees with respect to one another whereby to cause one piston to advance toward the respective cover while the other piston recedes from its respective cover.

12. In a beverage brewing apparatus the combination of: a set of brewing cavities; each cavity being provided with an inlet port means and a withdrawal port means, the inlet and withdrawal port means being spaced from one another in a respective cavity; a piston adapted for reciprocatory motion disposed in each of said cavities and each piston closing one end of a respective cavity; a movable cover associated with an opposite end of each cavity and adapted when in contact therewith to close the same; motive means for moving each piston to one extreme end of the respective cavity in the direction of the inlet port means whereby to cause the respective inlet port means to become disposed between the piston and cover; means associated with each cavity for injecting a liquid and a solid beverage substance into the cavity; said motive means subsequently adapted to cause each piston in the respective cavity to advance toward the respective cover whereby to cause extraction of liquid from the respective cavity through said withdrawal port means with solid beverage substance remaining in the cavity and confined in the space between the respective piston and cover; means for subsequently removing the respective cover from the associated cavity whereby to open the respective end of the cavity while said motive means advances the associated piston toward the opening for causing said solid beverage substance to be expelled from the cavity; said motive means subsequently adapted to withdraw the respective piston to the opposite end of the associated cavity whereby to restore the removed cover to its position on the cavity, and coupling means between the motive means and said pistons for causing the pistons to be out of phase with respect to one another.

References Cited in the file of this patent

UNITED STATES PATENTS

| | | |
|---|---|---|
| 920,909 | Brewer | May 11, 1909 |
| 1,135,309 | Meakin | Apr. 13, 1915 |
| 2,868,109 | Davis | Jan. 13, 1959 |
| 2,935,011 | Perlman | May 3, 1960 |

FOREIGN PATENTS

| | | |
|---|---|---|
| 1,224,821 | France | Feb. 15, 1960 |